United States Patent [19]

Harney et al.

[11] Patent Number: 4,768,114
[45] Date of Patent: Aug. 30, 1988

[54] DISK CASSETTE LOADING/UNLOADING MECHANISM WITH RIGID SHUTTER OPENING DEVICE

[75] Inventors: James D. Harney, Rochester; Thomas D. Jensen, Himrod, both of N.Y.

[73] Assignee: Eastman Kodak Company, Rochester, N.Y.

[21] Appl. No.: 925,434

[22] Filed: Oct. 31, 1986

[51] Int. Cl.$^4$ ............................................. G11B 5/012
[52] U.S. Cl. ...................................................... 360/97
[58] Field of Search ................................... 360/97–99, 360/86, 96.6; 369/77.2, 291

[56] References Cited

U.S. PATENT DOCUMENTS 4,412,260  10/1983  Stricklin .............................. 360/97
4,646,285  2/1987  Ogusu ............................. 360/133 X

*Primary Examiner*—A. J. Heinz
*Attorney, Agent, or Firm*—William C. Dixon

[57] ABSTRACT

A disk cassette loading/unloading mechanism for use in a disk recorder or the like of the type having a disk drive mechanism comprises a pivotally mounted holder for holding a disk cassette. The holder is pivotally movable between a loading/unloading position in which a disk cassette is inserted into the holder to its loaded position and unloaded therefrom, and a recording position in which the disk in the disk cassette can be drivingly engaged by the disk drive mechanism. Insertion of a disk cassette into the holder to its loaded position automatically activates a rigid cassette shutter opening device to open the shutter, and causes the holder to move from its loading/unloading position into its recording position. The holder is moved by a cassette ejecting mechanism from its recording position to its loading/unloading position. The ejecting mechanism then ejects the disk cassette at least partially out of the holder.

9 Claims, 8 Drawing Sheets

DISK CASSETTE LOADING/UNLOADING MECHANISM WITH RIGID SHUTTER OPENING DEVICE

FIELD OF THE INVENTION

The present invention relates generally to a disk recorder or the like, and more particularly to a disk cassette loading/unloading mechanism for use in a disk cassette recorder or the like of the type having a disk drive mechanism.

BACKGROUND OF THE INVENTION

Recording and/or reproducing apparatus of the type in which a disk cassette is loaded into and unloaded from the apparatus are well known in the art. The disk cassette is of the type comprising a cassette housing containing a flexible magnetic disk. In such a conventional recording and/or reproducing apparatus, the magnetic disk is rotated at a high speed within the cassette housing, and at the same time a magnetic head is brought into contact with a magnetic surface of the magnetic disk while being moved in a radial direction of the magnetic disk to record or reproduce video, audio, or digital signals. Usually the disk cassette is held by a cassette holder and is moved together with the holder from a loading/unloading position to a recording position. When the disk cassette has been moved into the recording position, the magnetic head comes into contact with the magnetic surface of the magnetic disk to perform the recording or reproducing. The cassette is ejected by depressing an eject button which causes the cassette holder to rise via a pivoted cam member, for example, from the recording position to the loading/unloading position, where the cassette is ejected or unloaded from the cassette holder. U.S. Patents in which such a conventional recording and/or reproducing apparatus is disclosed are U.S. Pat. Nos. 3,593,327; 3,904,149; 4,257,075; and 4,573,093.

A serious drawback of the disk cassette loading/unloading mechanisms incorporated in conventional recording and/or reproducing apparatus is that they are of complicated design and construction, containing many interacting parts requiring a high degree of precision in manufacture in order for the mechanisms to operate properly. Accordingly, an object of the present invention is to provide a cassette loading/unloading mechanism for use in a recording and/or reproducing apparatus that is of simple design and construction, thoroughly reliable and efficient in operation, and economical to manufacture.

SUMMARY OF THE INVENTION

It is an object of this invention to provide a cassette loading/unloading mechanism for use in a disk cassette recorder or the like having upper and lower magnetic heads and a disk drive mechanism, wherein the disk cassette includes a record disk within the cassette, a leading end portion having front and rear edges, an aperture in the cassette extending to the front edge for insertion therethrough of the magnetic heads, and a shutter blade associated with the aperture and movable between an aperture-open position and an aperture-closed position, comprising:

a support plate;

a disk cassette holder mounted on the support plate for movement between a loading/unloading position in which a cassette is inserted into the holder to a loaded position or unloaded from the holder from the loaded position, and a recording position in which the disk in the cassette can be drivingly engaged by the disk drive mechanism; and an abutment member mounted on the disk cassette holder across which the leading end portion of the cassette is moved upon insertion of the cassette into the holder to its loaded position, the abutment member having a leading lip for engaging and moving the shutter blade to its aperture-open position upon such insertion of the disk cassette into the holder to its loaded position, the abutment member further having a trailing downwardly inclined surface to prevent the abutment member from catching on the rear edge of the cassette and preventing further removal of the cassette from its loaded position.

A more specific object of the invention is to provide an abutment member having an opening extending therethrough from the head to the outer end of a stem, and a metal insert is mounted within the opening in the abutment member. The stem extends through an opening in the base of the cassette holder and the outer end thereof is secured to the base. The abutment head has a lip of a radius of 0.015 cm, and a downwardly inclined surface defining an angle $\alpha$ with the horizontal of about 25 degrees.

Accordingly, the primary object and advantage of the present invention is to provide a disk cassette loading/unloading mechanism for use in a disk cassette recorder or the like that is of simple design and construction, thoroughly reliable and efficient in operation, and economical to manufacture.

Other objects and advantages of the invention will become apparent from the following detailed description taken in connection with the accompanying drawings.

BRIEF DESCRIPTION OF THE DRAWINGS

In the detailed description of the invention presented below, reference is made to the accompanying drawings, in which.

DETAILED DESCRIPTION OF THE INVENTION

Figure 1:
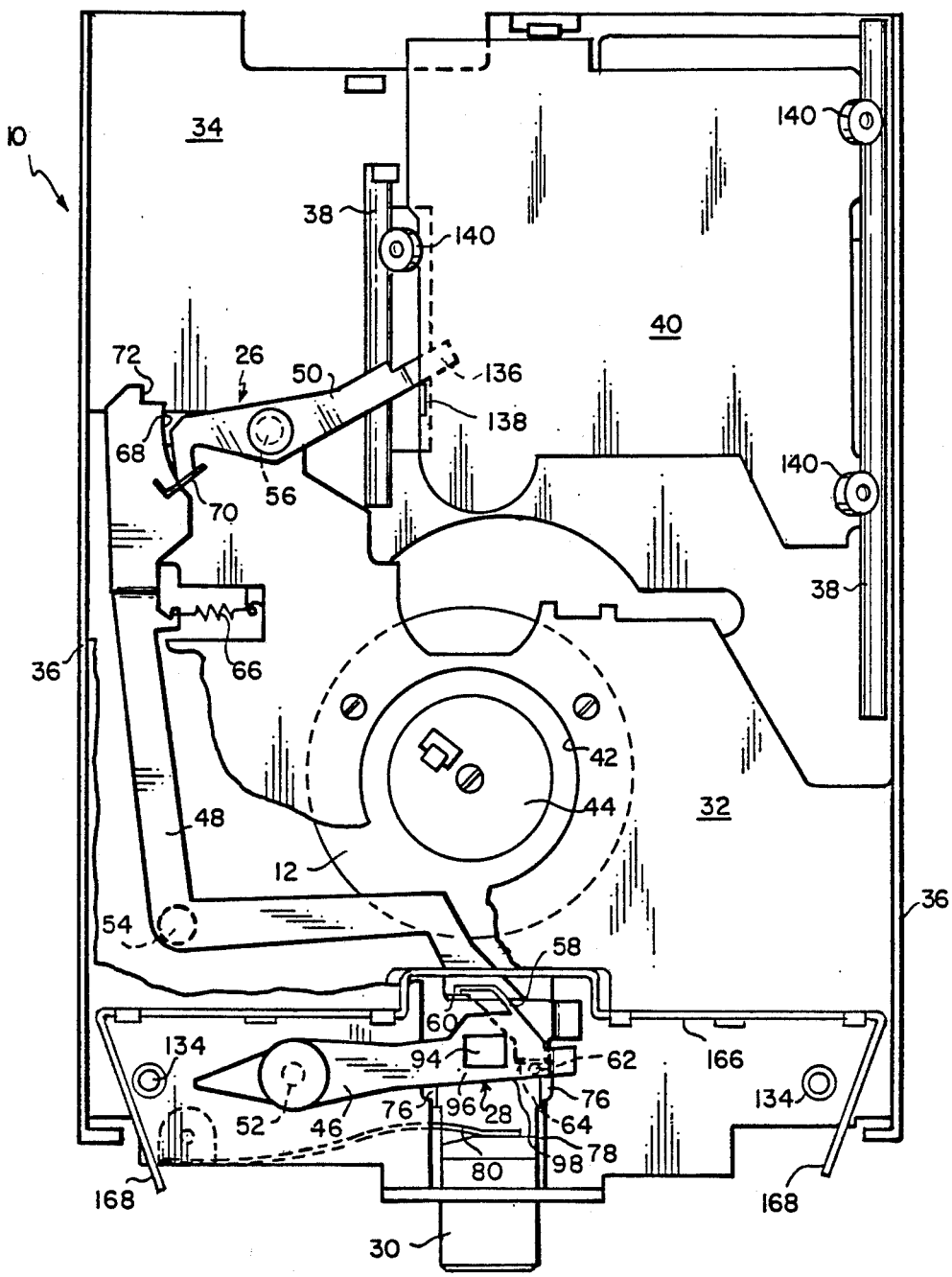
FIG. 1 is a top plan view of the support plate of the disk cassette loading/unloading mechanism with a portion thereof broken away.
Figure 2:
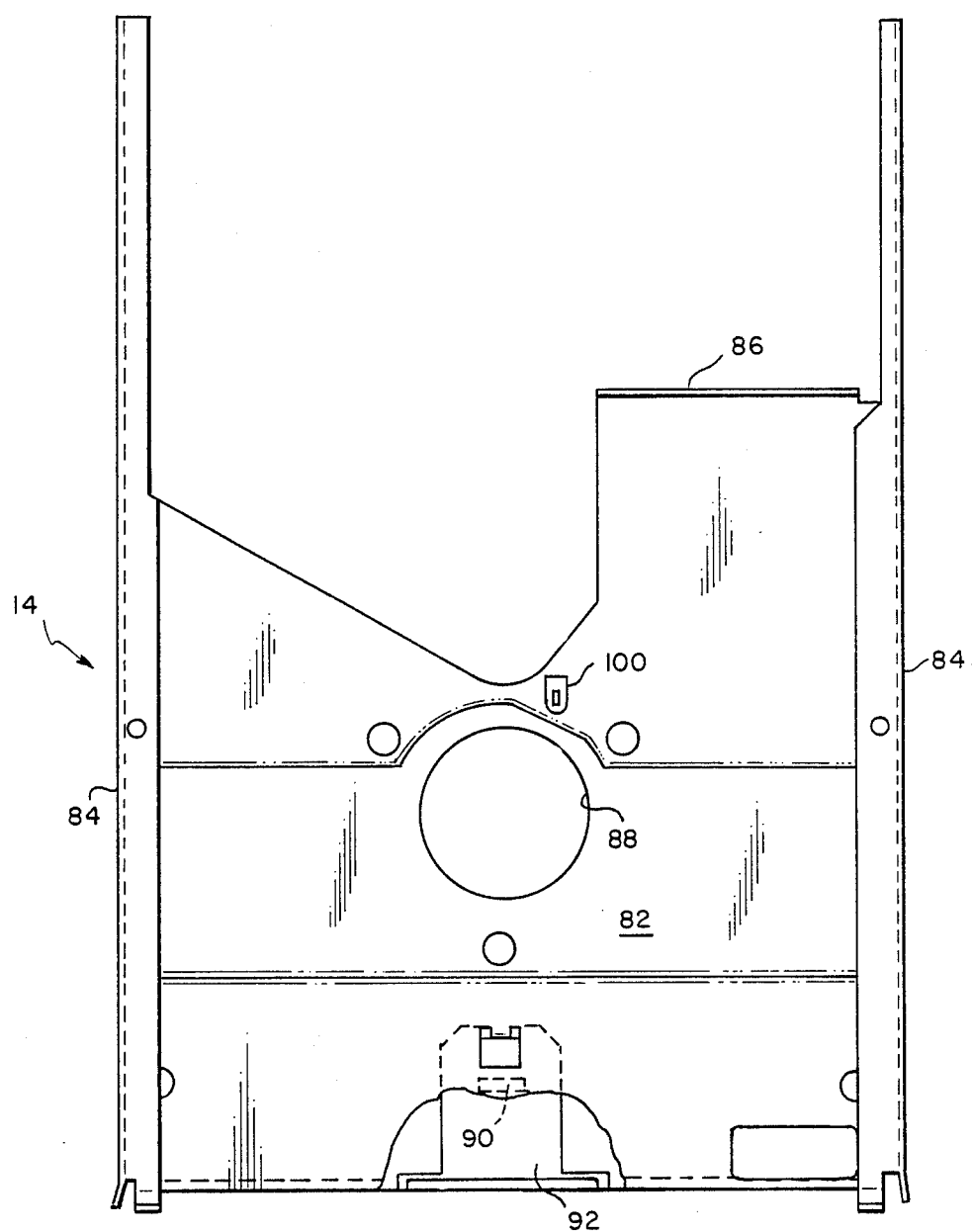
FIG. 2 is a top plan view of the disk cassette holder with a portion broken away showing the boss secured thereto.
Figure 3:
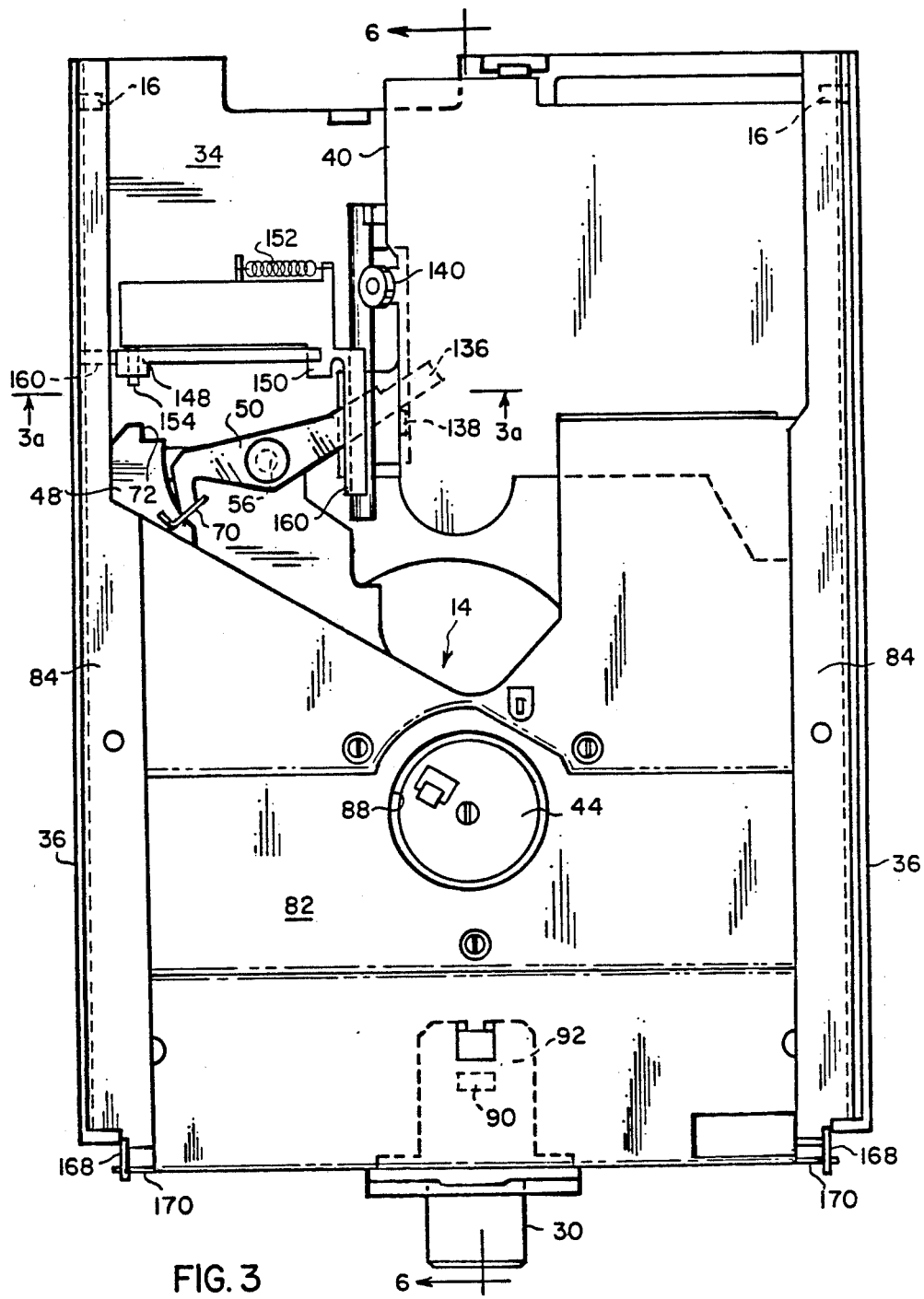
FIG. 3 is a top plan view of the disk cassette loading/unloading mechanism in its loading/unloading position, and also showing the magnetic head assembly and head assembly moving means.
Figure 4:
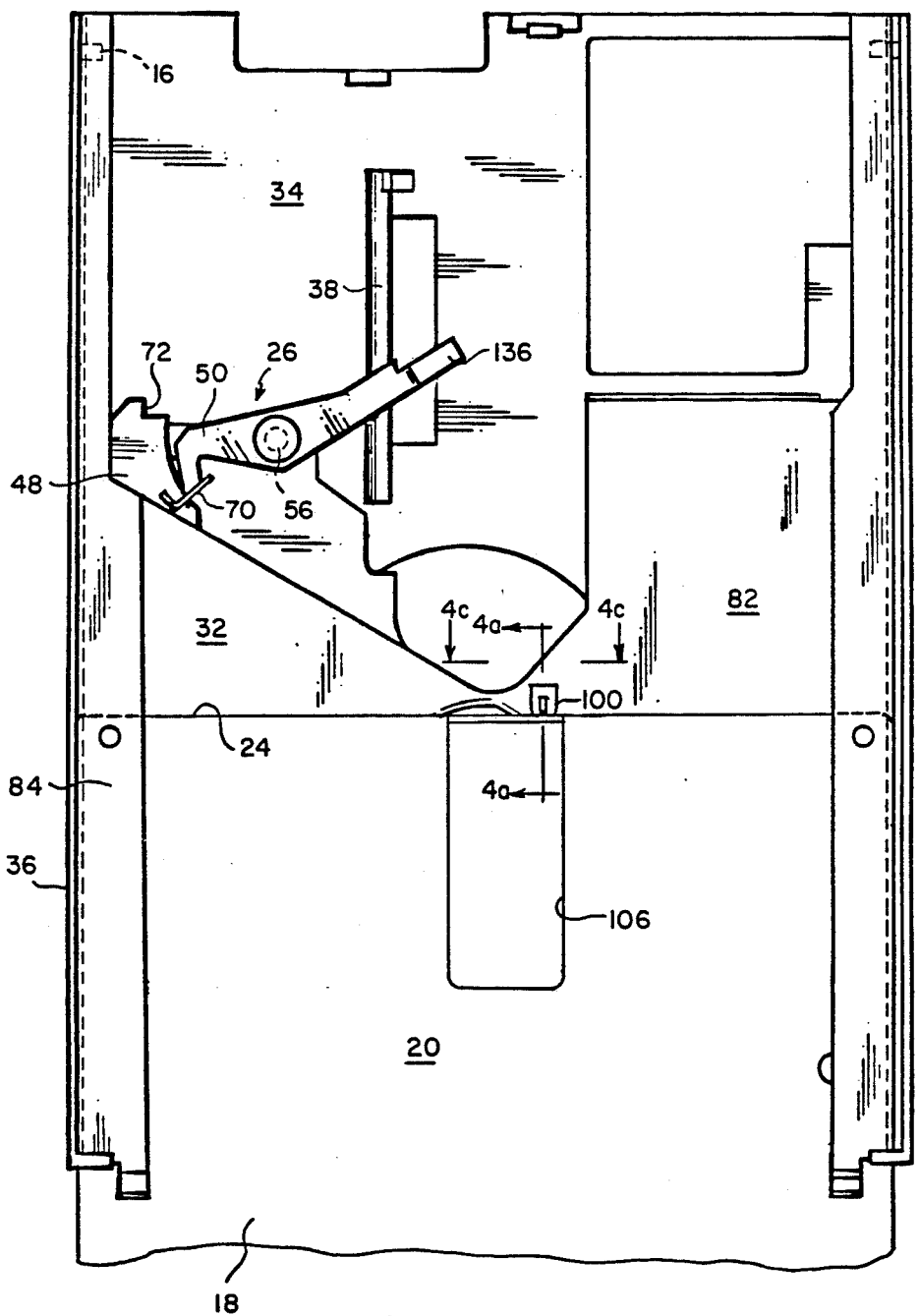
FIG. 4 is a top plan view of the disk cassette loading/unloading mechanism in its loading/unloading position showing a disk cassette inserted into the holder until the leading edge thereof engages a shutter opening abutment member.
Figure 5:
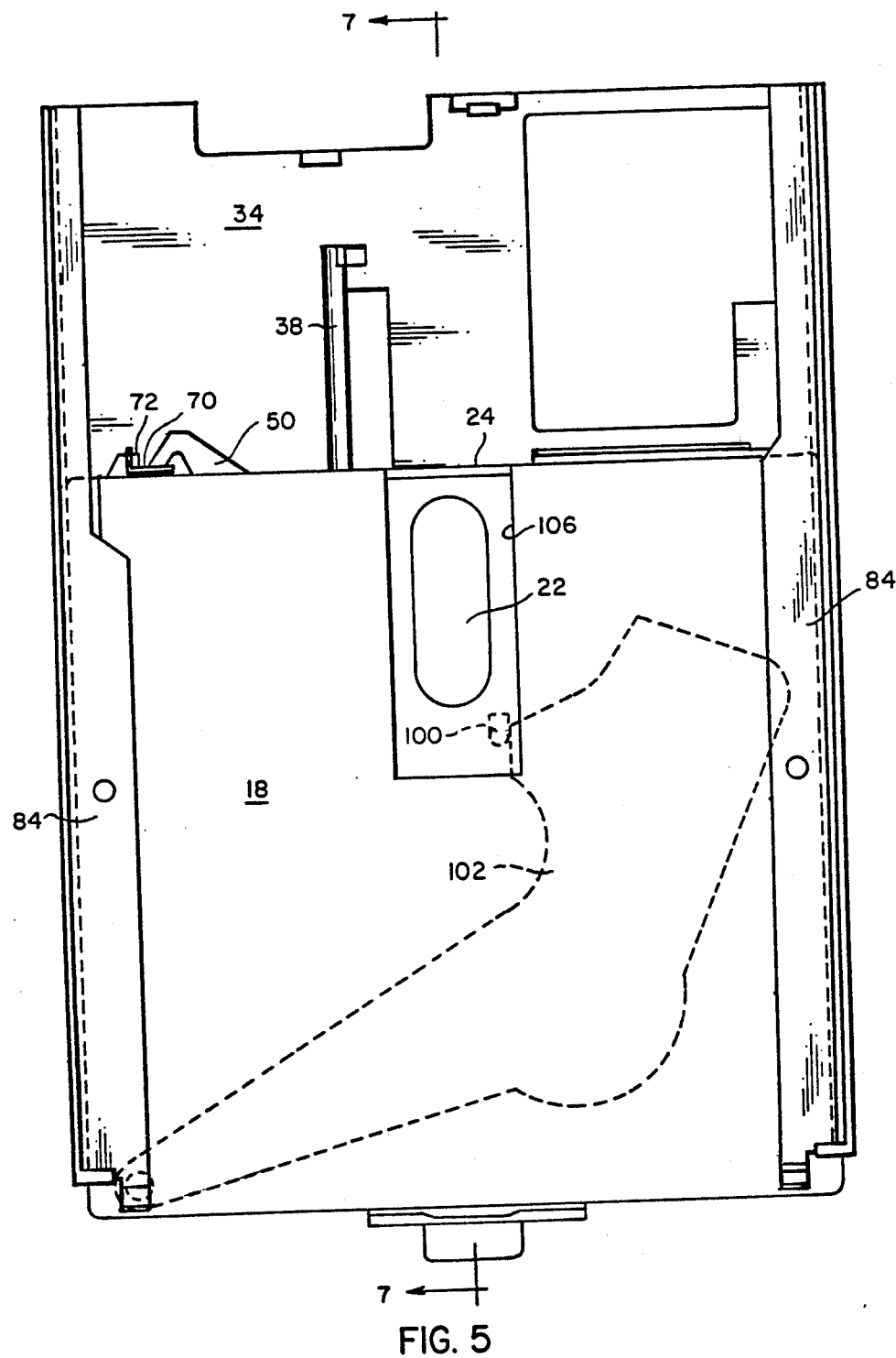
FIG. 5 is a top plan view of the disk cassette loading/unloading mechanism in a recording position, and showing the disk cassette in its loaded position with the cassette shutter blades in an open position.
Figure 3A:
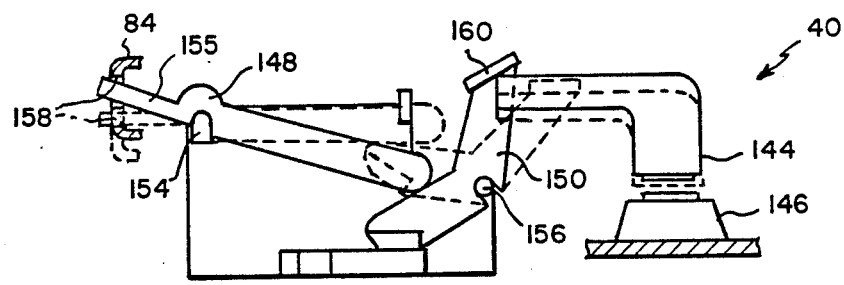
FIG. 3a is a segmental view of the upper magnetic head moving mechanism taken substantially from line 3a—3a of FIG. 3.

Referring now to FIGS. 1-3, a preferred embodiment of the disk cassette loading/unloading mechanism of this invention broadly comprises a support base 10, shown in FIG. 1, onto which a disk drive mechanism 12 is mounted. A disk cassette holder 14, shown in FIG. 2, is pivotally mounted on the support base about pivots 16, as shown in FIG. 3. A disk cassette 18, described later in connection with FIGS. 4-5, is of the type comprising a cassette housing 20 containing a flexible magnetic disk 22 or the like. The cassette holder 14 is pivotally movable between a loading/unloading position (FIG. 3), in which the cassette can be inserted into the holder to a loaded position or unloaded from the holder from the loaded position, and a disk recording position (FIG. 6), in which disk 22 in cassette 18 can be drivingly engaged by disk drive mechanism 12. When the cassette is manually inserted into holder 14 to its loaded position, the leading end 24 of the cassette cocks a cassette ejecting mechanism 26 (FIG. 1) and actuates a cassette holder supporting means 28 (FIG. 1) to release holder 14 for movement of disk cassette 18 to the disk recording position. Following the disk recording operation, the cassette is unloaded from the disk cassette loading/unloading mechanism by pressing a cassette ejection button 30. Inward movement of the button pivotally moves cassette holder 14 to its cassette loading/unloading position, and then releases the cassette ejection mechanism 26 which unloads cassette 18 by ejecting it at least partially out of the cassette holder.

With specific reference to FIG. 1, support base 10 comprises a unitary casting of aluminum or the like. The base has front and rear horizontal, vertically spaced plates 32, 34 respectively, the opposite edges of which are integral with upstanding side plates 36. The lower rear plate 34 supports a pair of steel cylindrical rails 38 in parallel spaced relation onto which a magnetic head assembly 40 is slideably mounted. The upper front plate 32 supports disk drive mechanism 12 on its undersurface, and further has a circular opening 42 through which a drive plate 44 of the disk drive mechanism extends for drivingly engaging the hub, not shown, of a magnetic disk 22.

The front plate 32 further pivotally supports first, second and third levers 46, 48, 50 respectively on its undersurface comprising a part of the disk cassette ejecting mechanism 26 and a part of the mechanism 28 for releasably supporting disk cassette holder 14 in its loading/unloading position. The first lever 46 is pivoted on pivot 52 for either supporting or releasing holder 14 as will be explained later. The second lever 48 is pivoted on pivot 54 and couples the first and second levers together. The third lever 50 is pivoted on pivot 56, and when it is cocked controls pivotal movement of first lever 46 for releasing cassette holder 14 for movement to the recording position. When third lever 50 is released, it ejects a cassette 18 at least partially out of holder 14.

Figure 8:
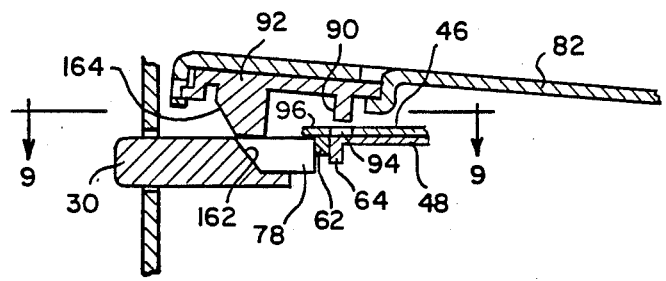
FIG. 8 is a segmental top plan view taken substantially from line 8—8 of FIG. 9 showing the eject button pressed inwardly for moving the holder to its loading/unloading position and the cassette ejection mechanism about to be released.
Figure 9:
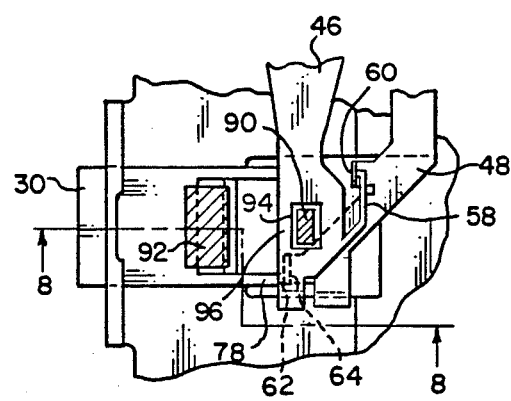
FIG. 9 is a view taken substantially from line 9—9 of FIG. 8.

The first and second levers 46, 48 respectively are coupled together by an integral spring arm 58 on first lever 46 engaging a lip 60 on second lever 48 for urging a depending pin 62 on first lever 46 into engagement with a lug 64 on second lever 48, as best seen in FIGS. 1, 8 and 9. The second lever 48 is biased in a clockwise direction by a helical spring 66 having one end connected to front plate 32 and its opposite end connected to second lever 48. An end of second lever 48 has an arcuate surface 68 that is biased by spring 66 into engagement with a lug 70 on one end of third lever 50. The arcuate surface 68 is concentric to pivot 56 such that pivotal movement of third lever 50 will not change the position of second lever 48 until lug 70 reaches a notch 72 at the end of arcuate surface 68. When this occurs, second lever 48 is moved clockwise capturing third lever 50 in its latched or cocked position (see FIG. 5) as lug 70 nests in notch 72. Such movement of second lever 48 pivots first lever 46 which releases cassette holder 14 in a manner to be explained herinafter for movement to the recording position.

The front plate 32 further slideably supports disk cassette ejection button 30 for reciprocal movement on spaced rails 76 between a normal retracted position and a cassette ejection position. The ejection button has an end surface on an outwardly extending finger 78 for engaging pin 62 on first lever 46 and pivotally moving the first and second levers to a position releasing the cocked third lever 50 upon manual inward movement of the cassette ejection button 30. The ejection button is held in its normal retracted position by a leaf spring 80 having one end secured to plate 32 and its free end bearing against the button.

With reference to FIG. 2, disk cassette holder 14 comprises a plate member 82 having opposite parallel U-shaped channel members 84 for slideably receiving edges of a disk cassette 18 inserted therein. The holder 14 has a stop lip 86 to limit insertion of disk cassette 18 to its loaded position. The plate member 82 has a circular opening 88 in register with opening 42 in support plate 32 for aligning a disk hub, not shown, in cassette 18 with drive plate 44. The cassette and disk hub are described in detail in a co-pending patent application Ser. No. 799,511, filed on Nov. 19, 1985 by the same assignee and now abandoned.

Figure 6:
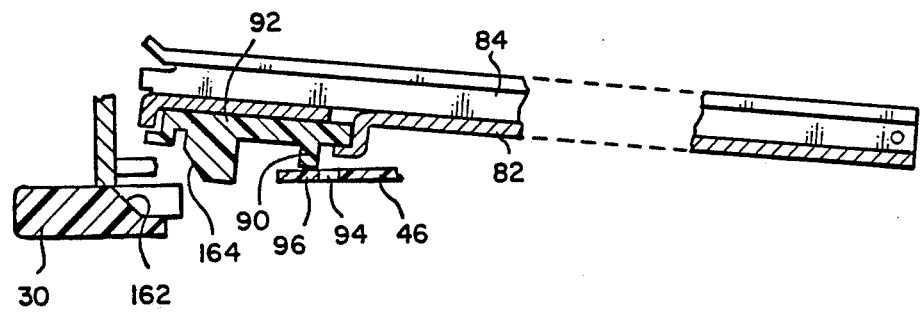
FIG. 6. is a section view taken substantially along line 6—6 of FIG. 3 showing the holder in its loading/unloading position with portions thereof omitted for purposes of clarity.
Figure 7:
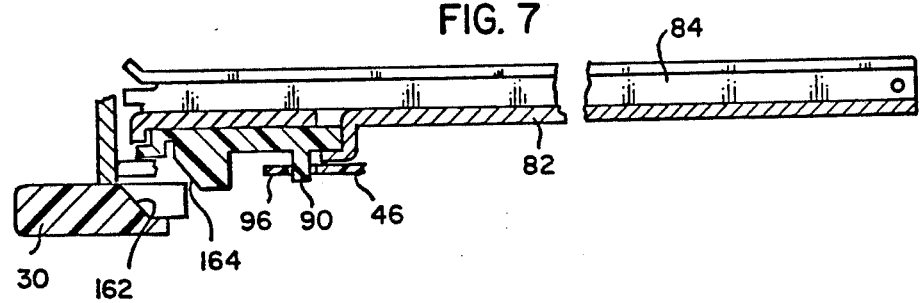
FIG. 7 is a section view taken substantially along line 7—7 of FIG. 5 showing the holder in its recording position with portions thereof omitted for purposes of clarity.

With reference to FIGS. 3, 3a, 5, 6 and 7, cassette holder 14 is shown pivotally secured to support base 10 on pivots 16 for pivotal movement between a normal loading/unloading position, as seen in FIGS. 3 and 6, and a recording position, as seen in FIGS. 5 and 7. The pivots 16 comprise laterally extending spindles on the inner surface of side plates 36 extending into openings in the inner ends of channel members 84. The cassette holder 14 is maintained in its normal loading/unloading position by a depending finger 90 on a boss 92 (see FIGS. 2 and 6) secured to the undersurface of plate 82. The first lever 46 defines an opening 94 (FIG. 1) extending therethrough, and finger 90 rests on a portion 96 of first lever 46 extending between an edge of opening 94 and an outer edge 98 of the first lever.

Figure 4A:
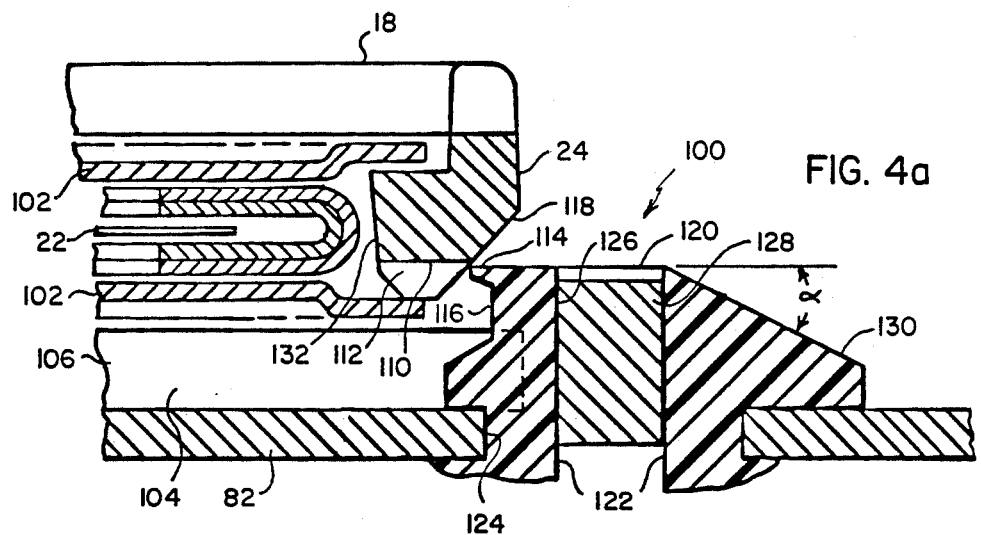
FIG. 4a is a segmental greatly enlarged section view taken substantially along line 4a—4a of FIG. 4.

With reference to FIGS. 4-5, cassette holder plate 82 further supports an abutment member 100 which is adapted when a disk cassette 18 is inserted into holder 14 to engage a shutter blade 102, as shown in FIG. 4a, for moving the shutter blades from their aperture-closed position to their aperture-open position, as shown in FIG. 5. Since the disk cassette is described in detail in a co-pending patent application Ser. No. 799,511 filed on Nov. 19, 1985 by the same assignee, only portions thereof pertinent to this invention will be shown and described.

With specific reference to FIGS. 4, 4a, 4b and 4c, disk cassette 18 has a bottom half 104 provided with a rectangularly shaped opening 106 that extends to the front edge 24 of the cassette to permit entry into the opening of abutment member 100. The front edge 24 of the top half of the cassette has a lower surface 110 provided with a depending lug 112 for engaging the upper surface of lower shutter blade 102. The lug 112 separates shutter blade 102 from surface 110 to form a gap therebetween for receiving a lip 114 of abutment member 100. The gap and lip 114 cooperate to assure engagement of abutment member 100 with an outer surface means or edge of shutter blade 102. Lip 114 enters the gap upon inward movement of the cassette and captures the shutter blade between the lip and a stem 116 of abutment member 100 to prevent the shutter blade from riding over the top of the abutment member. Cassette edge 24 has a bevelled portion 118 to assist entry of lip 114 into the gap. Further movement of abutment member 100 into the cassette upon movement of the cassette to the position shown in FIG. 5 is effective to move the shutter blades 102, which are secured together, to their aperture-open position.

Figure 4B:
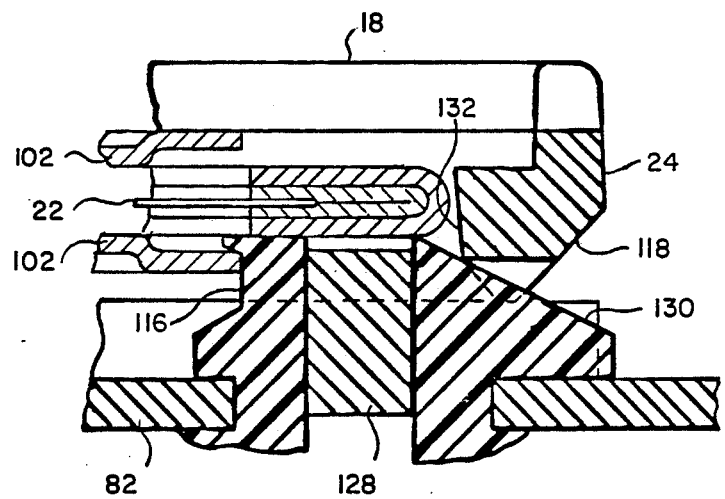
FIG. 4b is a segmental greatly enlarged view similar to FIG. 4a showing the cassette passing over the abutment member as it is ejected from the holder.
Figure 4C:
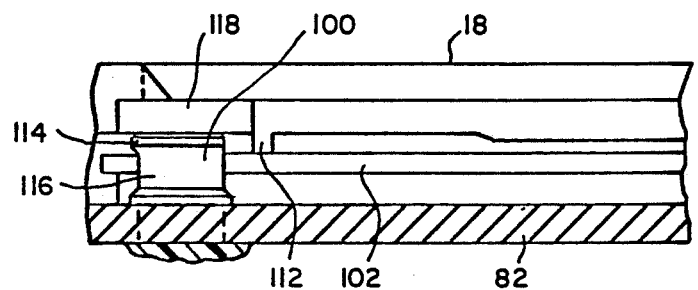
FIG. 4c is a segmental greatly enlarged view taken from line 4c—4c of FIG. 4.

More specifically, abutment member 100 is generally T-shaped having a head 120 resting on the upper surface of plate 82. The lip 114 on the leading end of head 120 has an arcuate shape having a radius of 0.059 inch (0.015 cm). The abutment member 100 is secured to plate 82 by legs 122 on stem 116 extending through an opening 124 in the plate and staked thereto by any suitable heating means. An opening 126 of rectangular cross-section extends through abutment member 100 for receiving a complementary shaped metal insert 128 to add strength to the staked abutment member. The trailing end of abutment member 100 has a flat downwardly bevelled surface 130 at an angle $\alpha$ of approximately 25 degrees to prevent the abutment member from catching on a sharp edge 132 of the cassette when it is ejected or removed from holder 14, as best seen in FIG. 4b.

With reference to FIGS. 5 and 7, the loading/unloading mechanism is shown in its recording position in which cassette shutter blades 102 are opened and disk hub is in driving engagement with drive plate 44. This position is achieved by inserting a disk cassette 18 through the outer open end of holder 14 in its loading-/unloading position (see FIGS. 3 and 6), and slideably moving the cassette therealong causing abutment member 100 to engage the outer end of a shutter blade 102 and cam the shutter blades into a shutter-open position upon further inward movement of the disk cassette. As the disk cassette is moved further inwardly to its loading position, the leading end 24 thereof engages an upwardly extending portion of lug 70 and pivots third lever 50 until the lug reaches second lever notch 72 and bottoms therein, as best seen in FIG. 5. As this occurs, second lever 48 pivots in a clockwise direction under the influence of spring 66. This, in turn, pivots first lever 46 in a clockwise direction via the spring arm 58 and lip 60 connection which maintains first lever pin 62 into engagement with second lever lug 64. Movement of first lever 46 moves portion 96 thereof out from under depending finger 90 on holder plate 82 causing the finger to drop through opening 94 in first lever 46, as best seen in FIG. 7. The holder 14 and disk cassette 18 contained therein drops along with finger 90 into a recording position. In this recording position, disk cassette 18 is precisely oriented by holder plate spindles 16, and a pair of locating pins 134 (FIG. 1) on front plate 32 passing through openings in holder plate 82 and into engagement with blind bores, not shown, in the cassette. Also, as third lever 50 is moved to its cocked position, the opposite end 136 thereof engages a lip 138 (FIGS. 1 and 3) on magnetic head assembly 40 for sliding the head assembly, via rollers 140 riding on steel ways 38, over the uncovered portion of the disk, with an upper magnetic head 144 (FIG. 3a) biased by a spring, not shown, away from a lower head 146. Levers 148, 150, in the dotted position shown in FIG. 3a, couple one of the channel members 84 to upper head 144 of the magnetic head assembly causing the upper head to move downwardly under the influence of spring 152 (FIG. 3), upon movement of cassette holder 14 to the recording position for pinching disk 22 between the upper and lower magnetic heads 144, 146 respectively for recording. The levers 148, 150 are pivoted about pivots 154, 156 respectively with a short end 155 of lever 148 extending through a slot 158 in channel member 84, and its opposite long end bearing against a short arm on lever 150. The longer end of lever 150 has a laterally extending finger 160 for engaging a surface on upper head 144 to force it downwardly under the influence of spring 152 into a recording position when cassette holder 14 is moved to its recording position. As indicated earlier, when the cassette holder is moved to its loading/unloading position, levers 148, 150 are moved into their full line position, shown in FIG. 3a, allowing spring 152 to retract finger 160 and upper head 144 to retract from the disk.

With reference to FIGS. 8 and 9, when it is desired to unload cassette 18 following a disk recording operation, cassette ejection button 30 is manually pressed inwardly. Initial movement of the button causes a bevelled surface 162 thereon to engage a bevelled surface 164 on cassette holder boss 92 and to cam cassette holder 14 pivotally upwardly withdrawing depending finger 90 from opening 94 in first lever 46. When finger 90 clears the opening, continued inward movement of ejection button 30 pivots the first and second levers 46, 48 respectively in a counterclockwise direction causing portion 96 of first lever 46 to move under depending finger 90. At substantially that moment, third lever lug 70 clears notch 72 (FIG. 5) releasing the cocked third lever 50 which ejects cassette 18 from holder 14. Upon release of ejection button 30, spring 80 (FIG. 1) returns button 30 to its normal retracted position. Also, depending finger 90 drops down onto portion 96 of first lever 46 and is pressed into engagement therewith (see FIG. 6) by a U-shaped wire spring 166 (FIG. 1) which has its center section mounted on front plate 32 and its ends 168 pressing downwardly on ears 170 (FIG. 3) on cassette holder 14.

The invention has been described in detail with particular reference to a preferred embodiment thereof, but it will be understood that variations and modifications can be effected within the spirit and scope of the invention.

We claim:

1. A disk cassette loading/unloading mechanism for use in a disk cassette recorder or the like having upper and lower magnetic heads and a disk-drive mechanism, wherein the disk cassette includes a record disk within the cassette, a leading end portion of the cassette having front and rear edges, an aperture in the cassette extending to the front edge for insertion therethrough of the magnetic heads, and a shutter blade associated with the aperture and movable between an aperture-open position and an aperture-closed position, comprising:

a support plate;

a disk cassette holder lying in a plane and mounted on the support plate for movement between a loading/unloading position in which a cassette is inserted into the holder to a loaded position or unloaded from the holder from the loaded position, and a recording position in which the disk in the cassette can be drivingly engaged by the disk-drive mechanism; and an abutment member mounted on the disk cassette holder across which the leading end portion of the cassette is moved upon insertion of the cassette into the holder to its loaded position, the abutment member having a leading lip for engaging and moving the shutter blade to its aperture-open position upon such insertion of the disk cassette into the holder to its loaded position, the abutment member further having a top surface and a trailing inclined surface engageable with the rear edge of the leading end portion of the cassette for guiding the rear edge over the abutment member, thereby preventing the abutment member from catching on the rear edge of the leading end portion of the cassette, and preventing further removal of the cassette from its loaded position.

2. A disk cassette loading/unloading mechanism according to claim 1 wherein the trailing inclined surface defines an angle $\alpha$ with the plane of the cassette holder of about 25°.

3. A disk cassette loading/unloading mechanism according to claim 2 wherein the disk cassette holder has a base lying in the plane of the cassette holder, the base having an opening therethrough, and the abutment member has a head and a stem having an outer end extending through the base opening, and the outer end of the stem is secured to the base.

4. A disk cassette loading/unloading mechanism according to claim 1 wherein the abutment member has a head having a leading arcuate lip of a radius of 0.015 cm and a trailing inclined surface defining an angle $\alpha$ with the plane of the cassette holder of about 25°.

5. A disk cassette loading/unloading mechanism according to claim 4 wherein the abutment member has an opening extending therethrough from the head to the outer end of the stem, and a metal insert is mounted within the abutment opening.

6. A disk cassette loading/unloading mechanism according to claim 1 wherein the abutment member and the cassette move relatively to one another in the plane of the cassette holder, and wherein the rear edge of the leading end portion is transverse to the plane of the cassette holder.

7. A disk cassette loading/unloading mechanism according to claim 6 wherein the trailing inclined surface defines an angle $\alpha$ with the plane of the cassette holder of about 25°.

8. A disk cassette loading/unloading mechanism according to claim 7 wherein the disk cassette holder has a base lying in the plane of the cassette holder, the base having an opening therethrough, and the abutment member has a head and a stem having an outer end extending through the base opening, and the outer end of the stem is secured to the base.

9. A disk cassette loading/unloading mechanism according to claim 8 wherein the abutment member has an opening extending therethrough from the head to the outer end of the stem, and a metal insert is mounted within the abutment opening.

* * * * *